United States Patent [19]

Toral et al.

[11] Patent Number: 5,051,922
[45] Date of Patent: Sep. 24, 1991

[54] METHOD AND APPARATUS FOR THE MEASUREMENT OF GAS/LIQUID FLOW

[75] Inventors: Haluk Toral, 11 Delaware Mansions, Delaware Road, Maida Vale, London W.9.; Tarek Darwich, London, both of England

[73] Assignee: Haluk Toral, London, England

[21] Appl. No.: 382,980

[22] Filed: Jul. 21, 1989

[30] Foreign Application Priority Data

Jul. 21, 1988 [GB] United Kingdom ................ 8817348

[51] Int. Cl.$^5$ .............................................. G01F 1/74
[52] U.S. Cl. .................................. 364/510; 73/861.04
[58] Field of Search ............................. 364/510, 555; 73/861.04, 861.02

[56] References Cited

U.S. PATENT DOCUMENTS

| | | | |
|---|---|---|---|
| 4,397,190 | 8/1983 | Hulin | 73/861.04 |
| 4,535,620 | 8/1985 | Cunningham | 73/23.1 |
| 4,596,464 | 6/1986 | Hoffman et al. | 364/555 X |
| 4,661,913 | 4/1987 | Wu et al. | 364/500 |
| 4,845,981 | 7/1989 | Pearson | 73/151 |

Primary Examiner—Parshotam S. Lall
Assistant Examiner—S. A. Melnick
Attorney, Agent, or Firm—Foley & Lardner

[57] ABSTRACT

A method of determining flowrates of individual constituent phases of a flowing multiphase medium includes digitizing electrical output signals from multiple sensors which produce signals in response to fluctuating high frequency hydrodynamic and physical property characteristics of the flowing medium. The nethod also includes deriving from the signals a plurality of stochastic features in amplitude and frequency domains such as a standard deviation, a coefficient of skewness, a coefficient of kurtosis, and linear prediction coefficients. Feature vectors are compared with a corresponding calibration map stored in a memory as a database relating feature vectors uniquely to flowrates of the component phases of the medium. Using a pattern recognition technique a unique match is determined as a measure of the flowrates of the component phases of the medium.

14 Claims, 11 Drawing Sheets

METHOD AND APPARATUS FOR THE MEASUREMENT OF GAS/LIQUID FLOW

BACKGROUND OF THE INVENTION

This invention relates to a method and apparatus for the measurement of flowrates in a flowing multiphase medium.

There is much demand, for example in the oil exploration and production industry and in chemical processing, to be able to measure the respective flowrates of, say, gas and liquid in a two phase stream. Traditionally such measurements have been achieved mainly by separation of the gas and liquid streams.

SUMMARY OF THE INVENTION

According to the present invention there is provided a method of determining the flowrates of individual constituent phases of a flowing multiphase medium, comprising:
  monitoring an electrical output signal from a detector which produces the output signal in response to one or more flow-related characteristics of the flowing medium;
  deriving from the output signal a plurality of amplitude and/or frequency parameters;
  comparing each of the parameters with a corresponding calibration map relating that parameter to a range of possible flowrates of the component phases of the medium; and,
  determining as a measure of the flowrates of the component phases of the medium, a unique flowrate common to all of the calibration maps which is uniquely related to the plurality of parameters.

In a specific embodiment of the invention the respective flowrates of gas and liquid in a two-phase medium are determined from parameters derived from the waveform of electrical signals which are related to the absolute pressure of the medium, the differential pressure across radially and axially separated tappings and the areal void fraction. The electrical signals related to pressure can be obtained from ordinary electronic pressure transducers and those related to void fraction can be obtained from capacitance or magnetic radiation absorption related transducers. Any transducer which generates a high frequency waveform related to flow characteristics such as pressure, differential pressure and void fraction is suitable to generate the output signal for analysis by the present invention.

The calibration maps may be constructed using standard mixtures of a type similar or identical to the mixture to be measured. However, while it may be unlikely that a calibration applicable universally to all types of fluid and all configurations of flowline may be achieved, it is not believed to be necessary to recalibrate for every unique intended field of application.

It has been found that upstream and downstream influences can be isolated by flow mixers and that the unique characteristics of the signals can be enhanced by obtaining the pressure signals across a choke such as an orifice plate.

Thus it is proposed that a uniquely configured measuring pipe, illustrated in FIG. 10, can be provided to implement calibration maps obtained in the laboratory at application sites.

The measuring pipe will be equipped with a flow mixer at its inlet which first creates a homogeneous mixture of gas and oil, to provide a datum, isolated from upstream influences. At the point of mixing the inlet, the turbulent characteristics are those of bubbly flow irrespective of the gas to oil ratio. We now propose to let the flow regime develop for an optimum distance downstream in the measuring pipe to allow it to regain its unique turbulent characteristics related to a particular gas to oil ratio. Finally at the exit of the pipe there will be another mixer to isolate any downstream influences. Sensors will be located at an optimum distance in the measuring pipe and may be located across an orifice at this point of measurement.

It is preferred that the calibration maps be stored in an electronic memory and the comparison of the detector output with the calibration maps be carried out by data processing means.

This invention is based on a hitherto unknown fact that the turbulence characteristics of multiphase flow can be uniquely correlated to the flowrate of the individual constituent phases, for example as manifested on the alternating current signal output of pressure and differential pressure electronic transducers and void fraction (capacitance and magnetic absorption or other) transducers.

In simple terms, given for the purpose of explanation, the invention is based on analysis of the output from one or more than one detector which responds to some flow-related characteristic, such as pressure, by generation of an output signal. The output signal is analysed by known computer algorithms, such as those used in the speech recognition field, to obtain and allocate numerical values to the amplitude and frequency characteristics of the signal components. Each of the values will have been previously related to flowrate in calibration runs to produce a series of maps of regions where that same numerical value relates to specific ratios of flow of the phases involved. By sequentially comparing the numerical values with the plurality of calibration maps, it is possible to obtain a unique value for the flowrates of the phases. Other mathematical methods could be selected to model the power spectrum density and the probability distribution function, of the waveforms.

Thus, in embodiments of the invention, the following steps can be used to produce a database of calibration maps:

1. The "turbulence signature" of the flow is detected using, for example, absolute, differential and void fraction transducers and is recorded in digital form;

2. The turbulence record so obtained is reduced to a set of parameters by computer algorithms which characterise the properties of the signature in frequency and amplitude domains (the nature of these algorithms is not an essential, limiting feature of this invention. Suitable mathematical algorithms include those known in the art in voice recognition techniques);

3. A database is assembled of superficial velocity contour maps of each parameter.

The mathematical algorithms are basically employed to 'fingerprint' random signals by defining those signals in terms of a set of parameters.

Measurement of flowrate is most preferably carried out with the same type of transducers used for the construction of the calibration maps held in the database. The same statistical parameters can be derived from the output and compared sequentially with the calibration to derive a unique result for the flow rates of the phases involved in the flow. Thus the set of parameters derived from measurement is compared against parameters stored in the database to provide a "best match" of the particular flowrate.

For some signals it may be possible to model the time domain component of the signal as well as the amplitude and frequency domains.

BRIEF DESCRIPTION OF THE DRAWINGS

A specific embodiment of the invention will now be described by way of a non-limiting example, with reference to the accompanying drawings, wherein.

DETAILED DESCRIPTION OF THE PREFERRED EMBODIMENT

A series of calibration maps were constructed on the basis of nine statistical parameters which were selected because of their ability to identify different flowrates. These parameters can be divided into amplitude and frequency domain parameters as described in further detail in Appendix A.

The amplitude domain parameters are standard deviation, coefficient of skewness and coefficient of kurtosis.

The frequency domain parameters are the all pole linear prediction model (LPM) and the cepstrum function parameters. The LPM coefficients comprise the residual error coefficient, and the first four predictor coefficients.

The foregoing parameters were derived from waveforms of absolute pressure, axial differential pressure and radial differential pressure at a plurality of measuring points. Surface equations were then fitted to these parameters according to:

PARAMETER = FUNCTION (superficial gas velocity, superficial liquid velocity)

where:

Volumetric flow rate of gas = superficial gas velocity × pipe cross sectional area.

Volumetric flow rate of liquid = superficial liquid velocity × pipe cross sectional area.

Each of these two dimensional FUNCTIONs can be represented as a unique contour map fitted to the data over the flow domain of interest. Examples of these maps are shown in FIGS. 1 to 6.

The calibration database is now compiled as a plurality of contour maps. For instance a total of twenty-seven contour maps would be employed with nine parameters derived from three signals of absolute pressure, axial differential pressure and radial differential pressure.

Not all the parameter maps in the database can be attached equal weighting. The relative strength of each parameter map (to identify different flowrates) were measured with the F-ratio test as described in further detail in Appendix B. For instance, it was observed that tapping separation exerted a strong influence on the strength of the axial differential pressure waveform. Also, LPM coefficients of order five or greater were rejected on the grounds of their low F-ratios. The F-ratio can also vary from region to region.

Two methods were employed for finding the best match between the measured and the calibration parameter set. These were the template matching method based on the minimum Euclidian distance between the measured and the calibration set as described in further detail in, Appendix C and a heuristic technique specially developed by the inventor.

The template matching technique is amenable for the introduction of weighting factors based on the F-ratio of the parameters for the minimization of the Euclidian distance difference.

Figure 1:
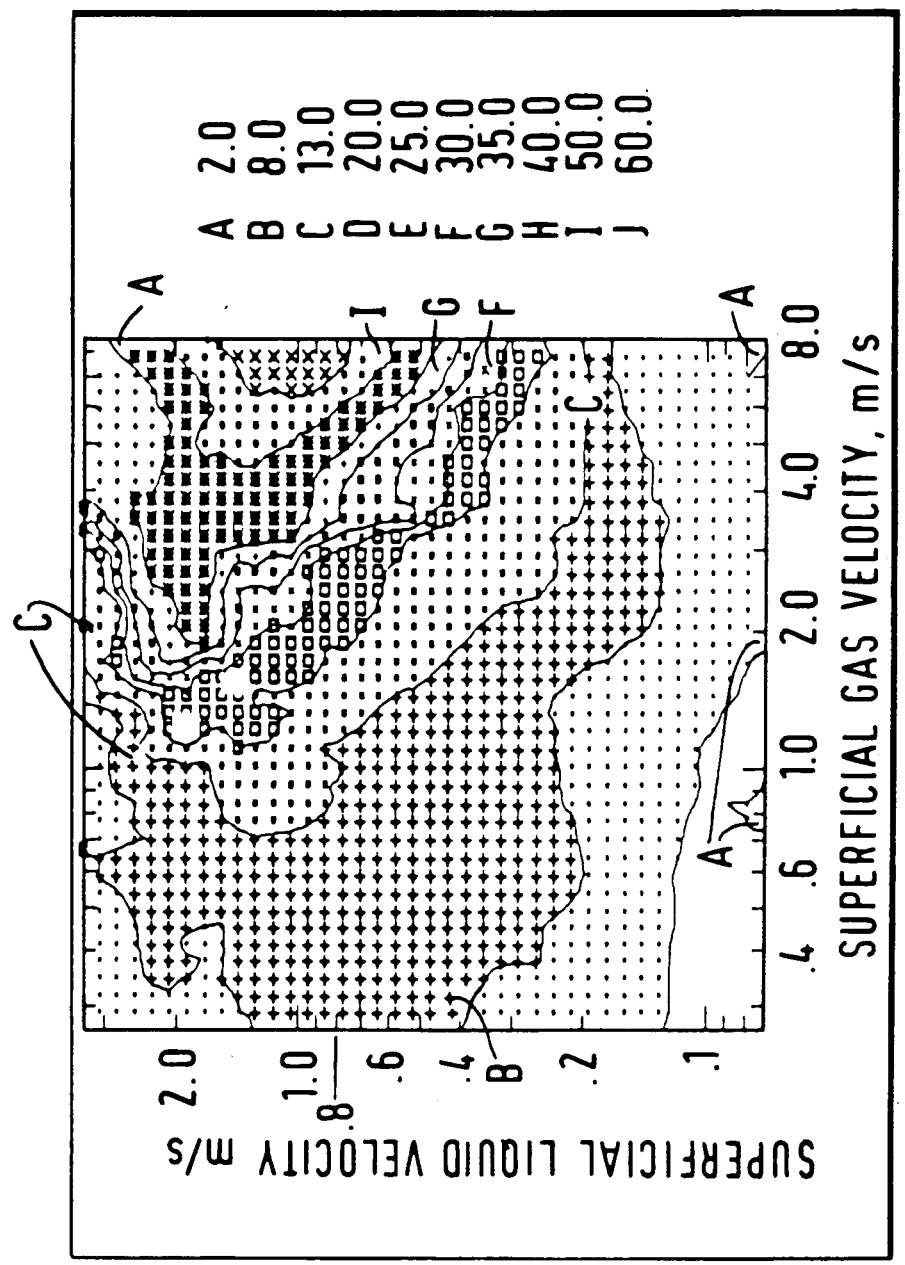
FIG. 1 is a diagram representing a standard deviation distribution of the absolute pressure signal.
Figure 2:
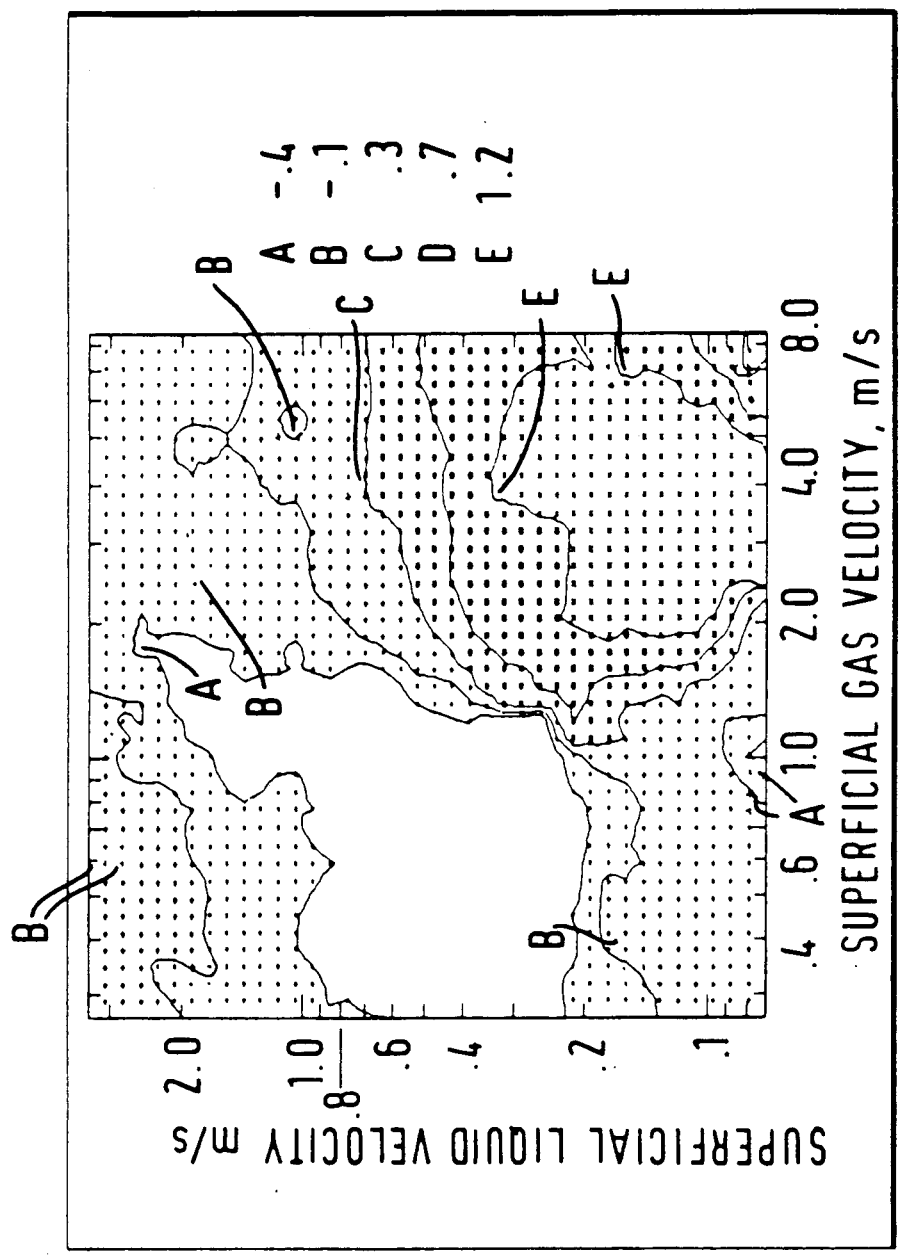
FIG. 2 is a diagram representing the coefficient of skewness distribution of the absolute pressure signal.
Figure 3:
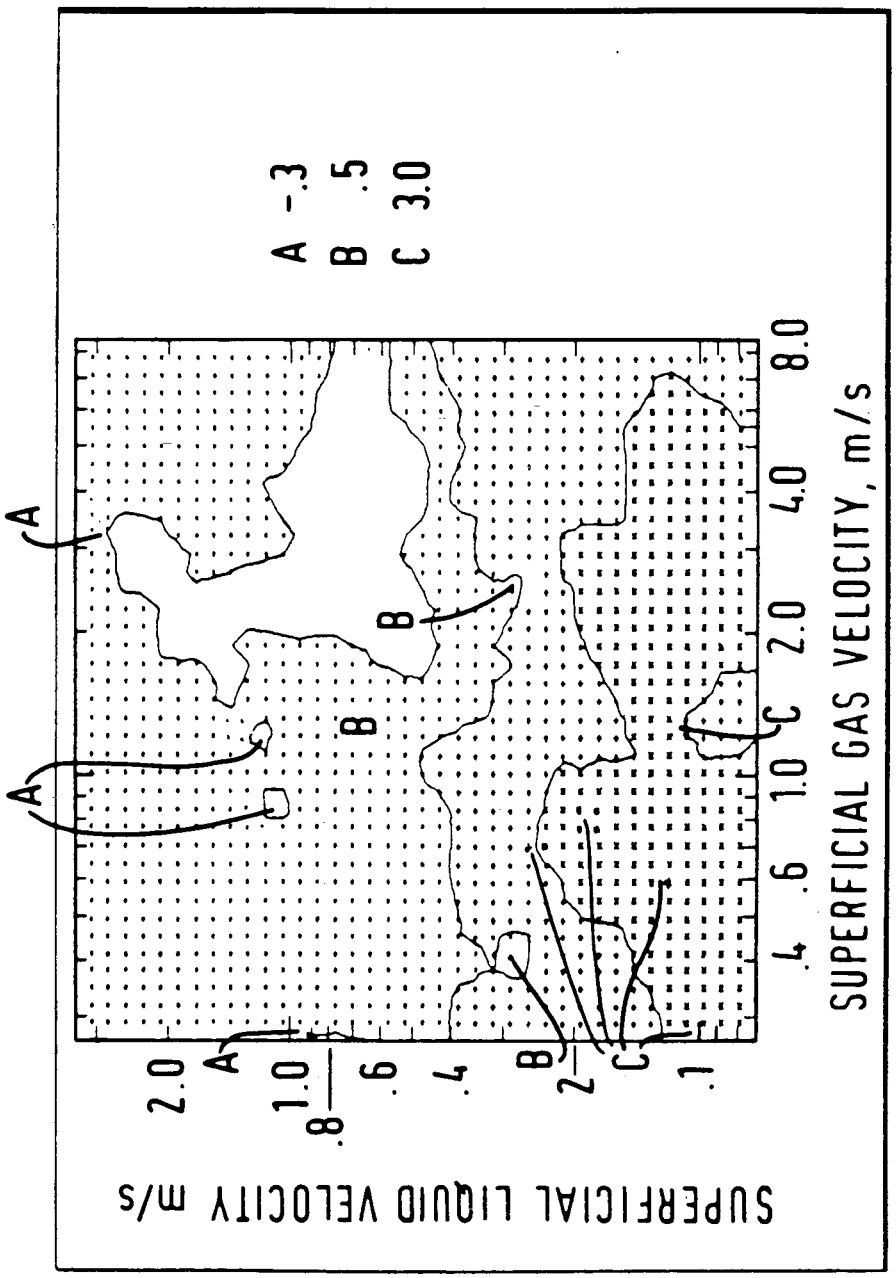
FIG. 3 is a diagram representing the coefficient of kurtosis distribution of the absolute pressure signal.
Figure 4:
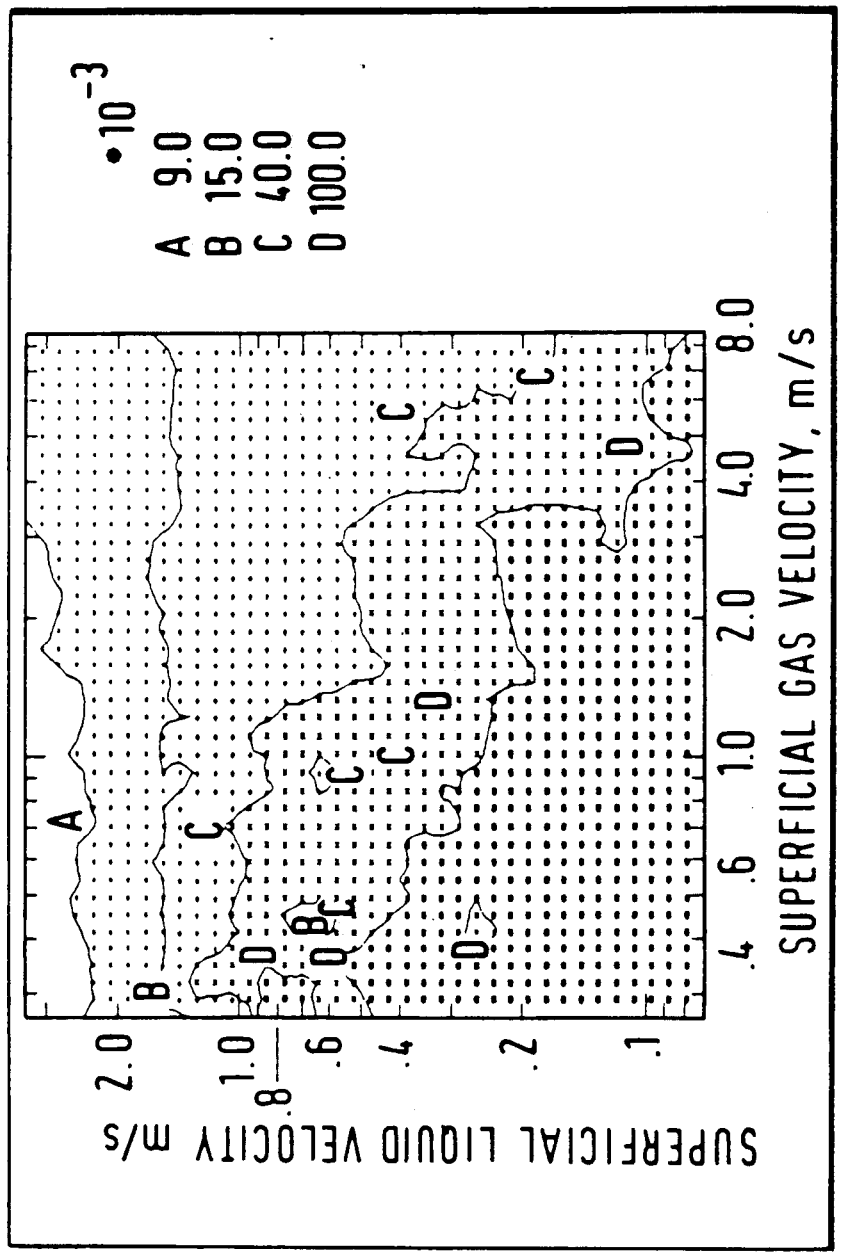
FIG. 4 is a diagram representing the linear prediction coefficient Vp distribution of the absolute pressure signal.
Figure 5:
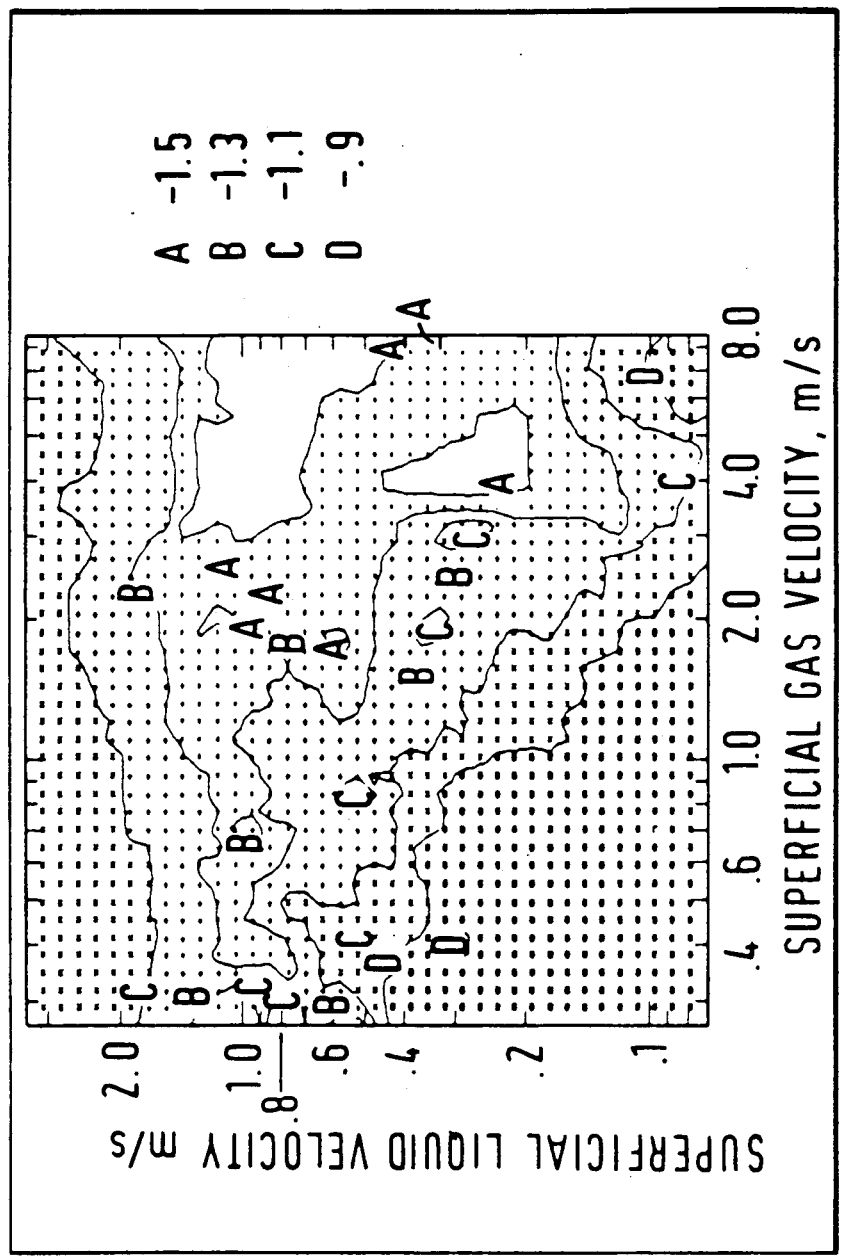
FIG. 5 is a diagram representing the linear prediction coefficient a, distribution of the absolute pressure signal.
Figure 6:
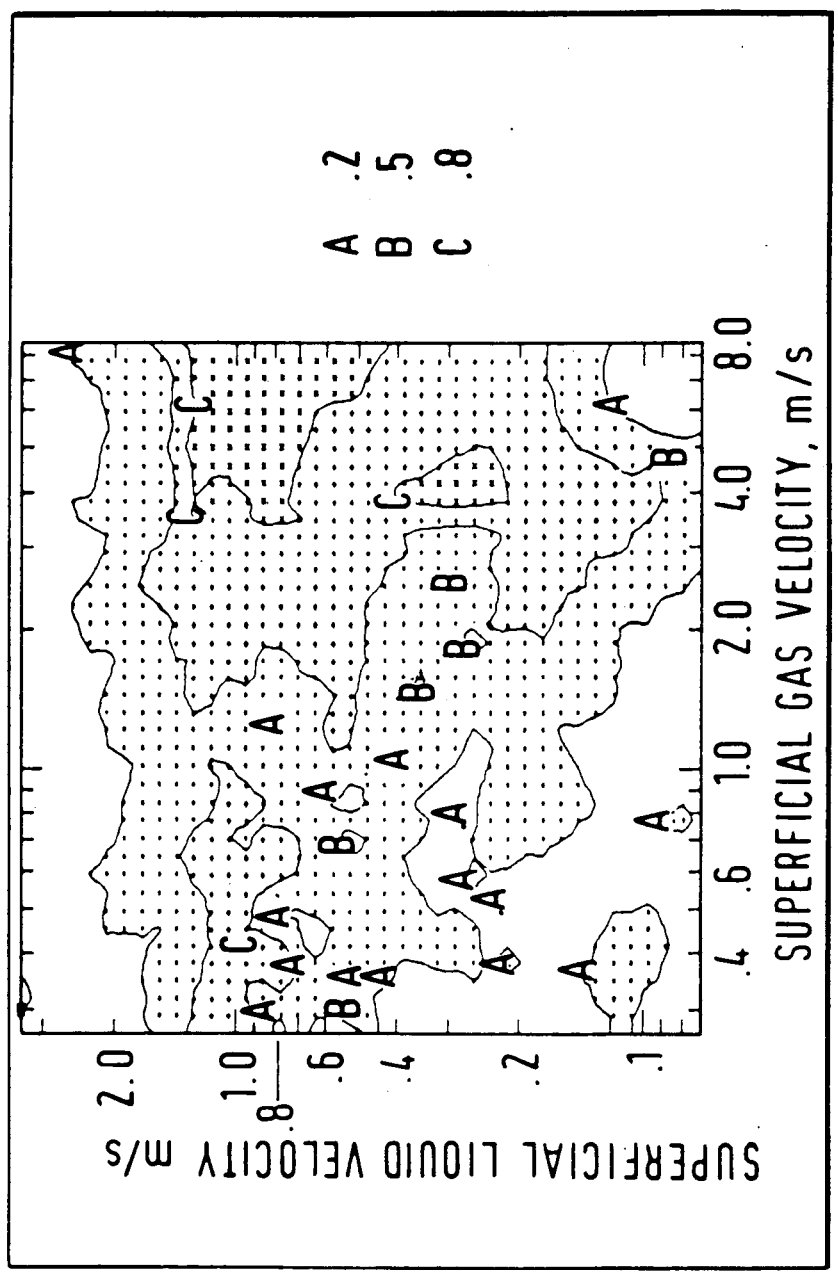
FIG. 6 is a diagram representing the linear prediction coefficient $a_2$ distribution of the absolute pressure signal.
Figure 7A:
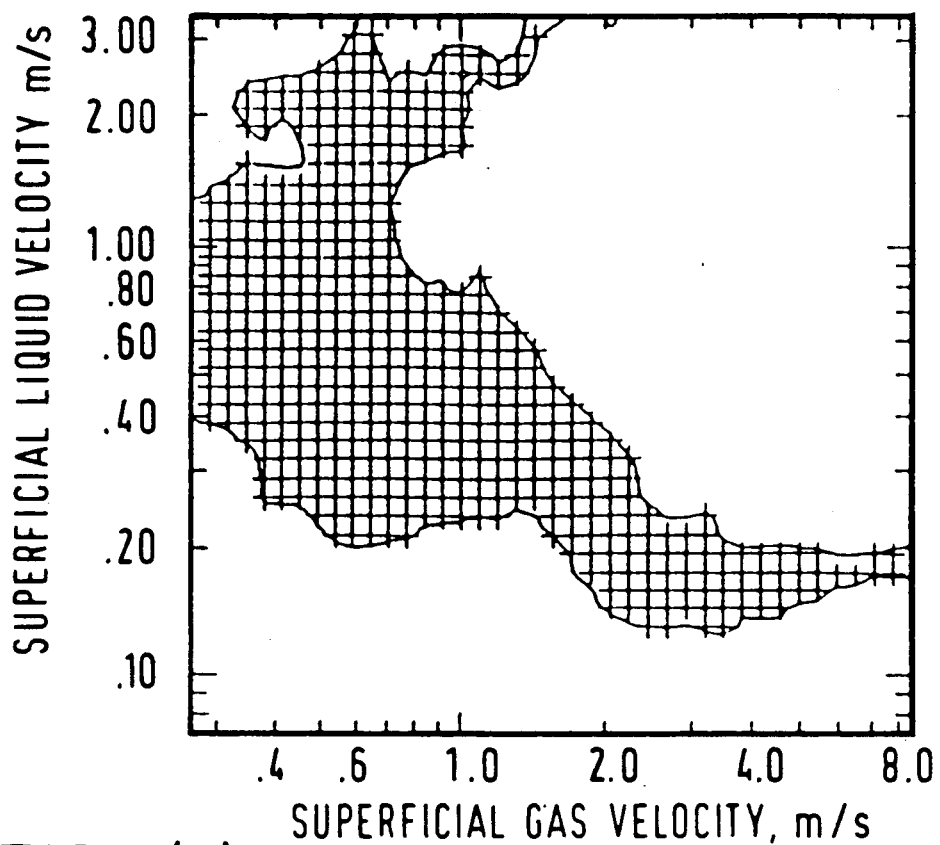
FIGS. 7a–7c illustrate a graphical illustration of the Heuristic recognition technique.
Figure 7B:
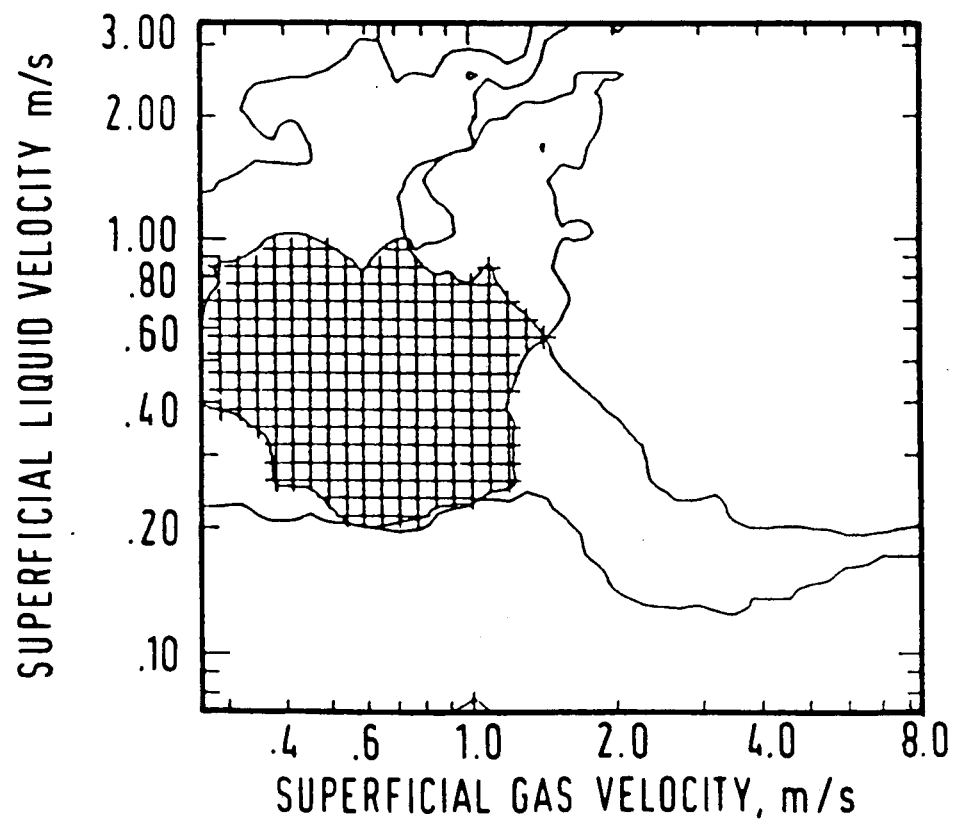
Figure 7C:
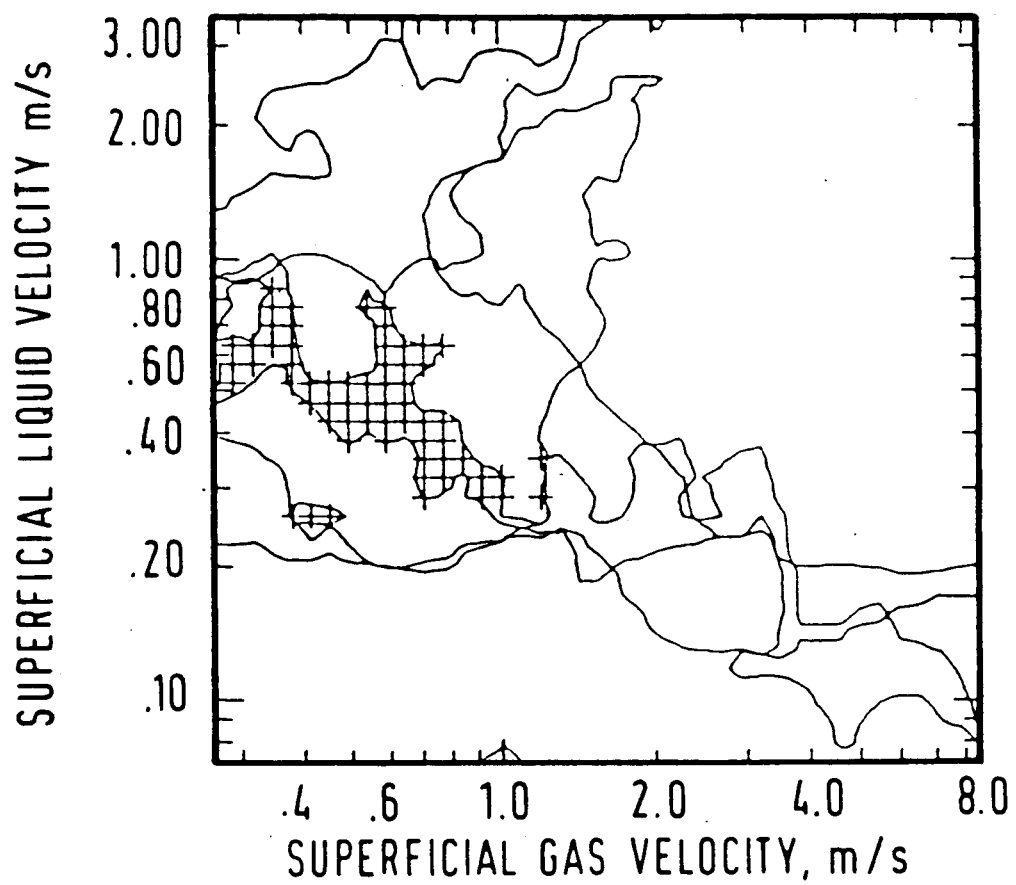
Figure 8:
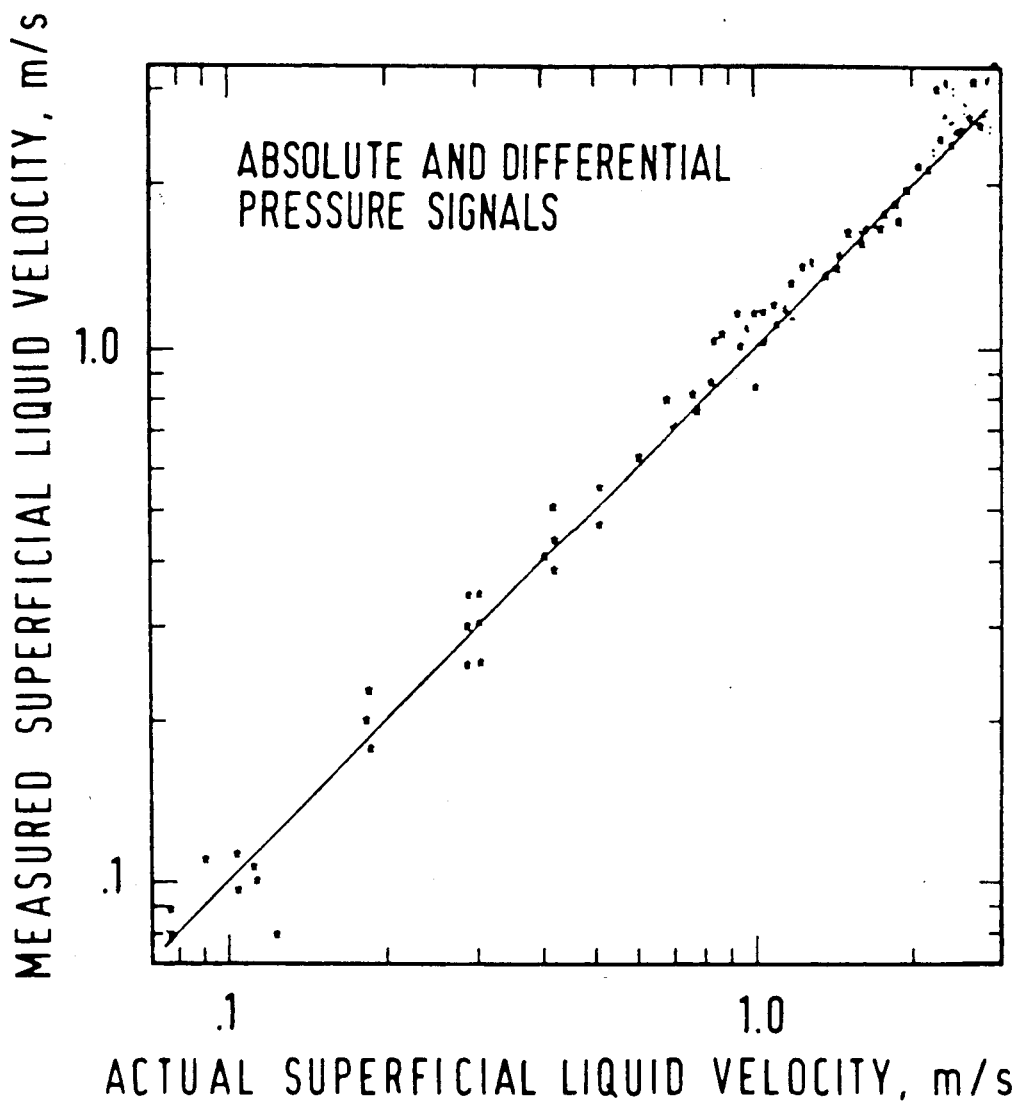
FIG. 8 is a plot of error in superficial liquid velocity measurement.
Figure 9:
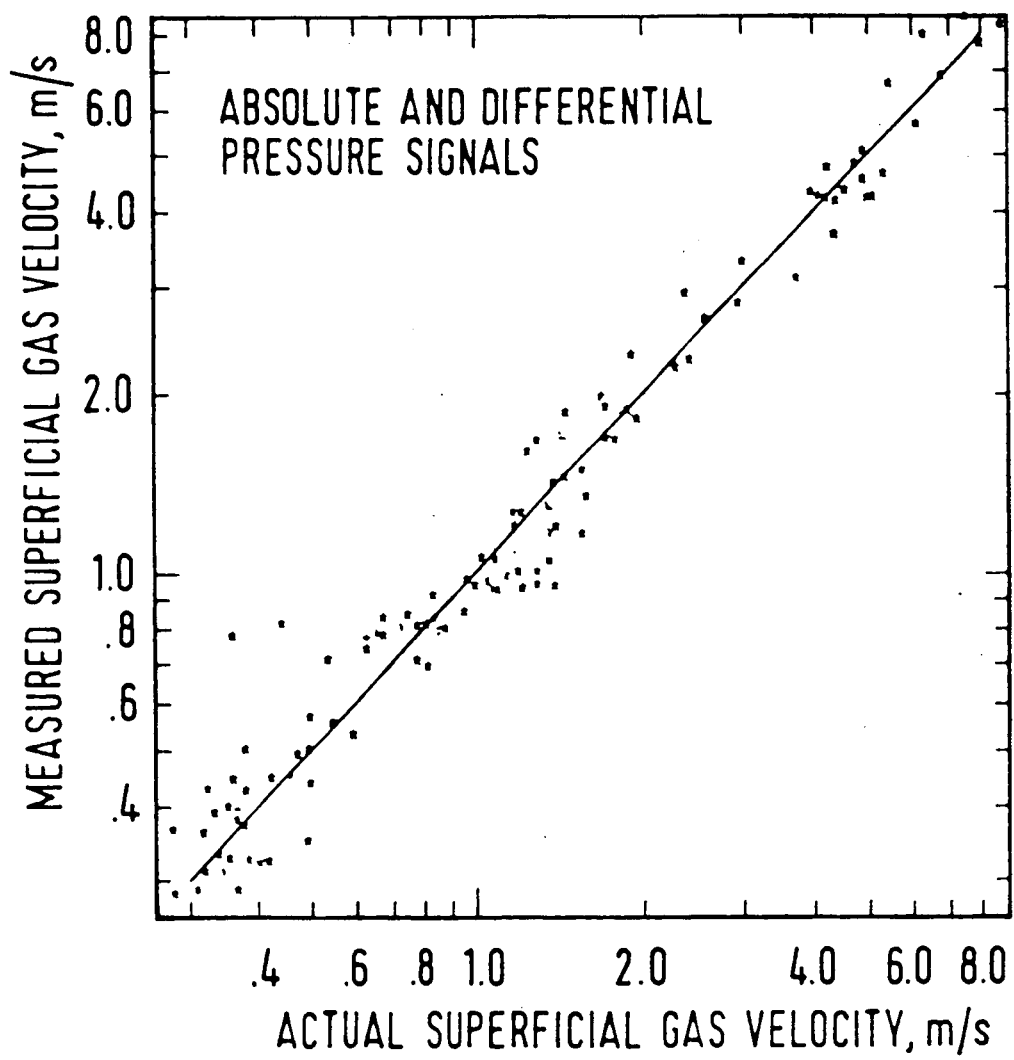
FIG. 9 is a plot of error in superficial gas velocity measurement.
Figure 10:
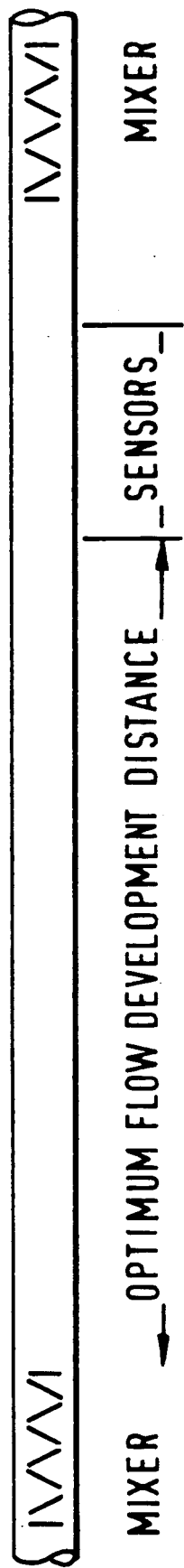
FIG. 10 illustrates a measuring pipe.

The heuristic technique was implemented as a computer program but its principles can be more clearly described graphically as follows:

With reference to the calibration maps shown on FIGS. 1 to 6, consider a flow condition for which the measured parameters are as follows; Standard Deviation = 5; Coefficient of Skewness = −0.5; Linear Prediction Residual Error Coefficient = 0.7. These parameters are located successively on FIGS. 1 to 6, each giving a region of relative gas and liquid flow velocities where each parameter may occur. By superimposing each region successively on the next map, the possible range of values is progressively narrowed. Thus, in this example, with values chosen (from an actual measurement at random), the region in which the liquid and gas velocities can lie are successively reduced as shown in the shaded regions on FIGS. 7 (a), (b), and (c). The accuracy of the method (as with template matching) depends on the strength of the F-ratio of the parameters over the flow domain in question.

In one specific test in a horizontal flow line, the accuracy of the measurements were within 5% for 85% of the measurements. The results of this test are shown on FIGS. 6 and 7.

APPENDIX A—STOCHASTIC PARAMETERS a. Amplitude Domain Parameters

The probability density function of a random signal describes the probability that the sampled data will assume a particular value within some defined range at any instant of time. The probability density function, p (x), can be defined as follows:

$$p(x) = \lim_{\Delta x \to 0} \frac{\text{Prob}(x \leq x(t) \leq x + \Delta x)}{\Delta x} \quad (1)$$

$$= \lim_{\Delta x \to 0} \frac{1}{\Delta x} \left( \lim_{T \to \infty} \frac{T_x}{T} \right)$$

where p (x) is the probability density function of a sample time history record x (t) and T is the observation time. The moments associated with the probability density function can be used as descriptive measures of the distribution. These moments are the mean (first moment about the origin), the standard deviation (second moment about the mean), the coefficient of skewness (third moment about the mean) and the coefficient of kurtosis (fourth moment about the mean). The mean, x, is the average value of the data points and can be defined as follows:

$$\bar{x} = \frac{\sum_{i=1}^{n} x_i}{(n-1)} \tag{2}$$

where n is the total number of points in the sampled record. The standard deviation is the root mean square of the deviations from the arithmetic mean and is a measure of the dispersion of the data. The standard deviation, SD, is defined as:

$$SD = \left( \frac{\sum_{i=1}^{n} (x_i - \bar{x})^2}{(n-1)} \right) \tag{3}$$

When a distribution is not symmetrical about its mean value, it is said to be skew. If the tail of the distribution is longer on the right of the mode (the highest point on the distribution), the distribution is said to be skewed to the right or to have positive skewness. Similarly, if the tail is longer on the left, the distribution is skewed to the left or has negative skewness. The coefficient of skewness, CS, is defined as:

$$CS = \frac{\sum_{i=1}^{n} (x_i - \bar{x})^3}{(n-1)(SD)^3} \tag{4}$$

Kurtosis is the peakedness of a distribution. The normal curve is taken as the standard of peakedness. A curve less peaked than the normal is said to be platykurtic and a more peaked curve is said to be leptokurtic. The coefficient of kurtosis, CK, is defined as:

$$CK = \left( \frac{\sum_{i=1}^{n} (x_i - \bar{x})^4}{(n-1)(SD)^4} \right) - 3 \tag{5}$$

b. Frequency Domain Features

Linear prediction provides a method to obtain the characteristics of the spectral density function of the signal. In this technique, the signal is modelled as a linear combination of its past values and past and present values of a hypothetical input to a system whose output is the given signal. According to this model, the signal, $x_t$, can be represented in the following form:

$$x_t = -\sum_{k=1}^{p} a_k x_{t-k} + G \sum_{l=0}^{q} b_l u_{t-l}, \; b_0 = 1 \tag{6}$$

where $a_k$, $1 \leq k \leq p$, $b_l$, $1 \leq l \leq q$, and the gain G are the parameters of the hypothesized system with some unknown input $u_t$. Equation (6) can be rewritten in the frequency domain by taking the Z-transform of both sides that yields:

$$H(z) = \frac{X(z)}{U(z)} = G \frac{1 + \sum_{l=1}^{q} b_l z^{-l}}{1 + \sum_{k=1}^{p} a_k z^{-k}} \tag{7}$$

where $$X(z) = \sum_{t=-\infty}^{\infty} x_t z^{-t} \tag{8}$$

is the Z-transform of $x_t$, U (z) is the Z-transform of $u_t$ and H (z) is the transfer function of the system, which is the general pole-zero model. The roots of the numerator and denominator polynomials are the zeros and poles of the model respectively. There are two special cases of the model which are: 1) all-zero model where $a_k = 0$, $1 \leq k \leq p$; 2) all-pole model where $b_l = 0$, $1 \leq l \leq q$. The following section describes the all-pole model employed in this specific embodiment of the invention.

In the all-pole model, equations (6) and (7) are reduced to:

$$x_t = -\sum_{k=1}^{p} a_k x_{t-k} + G u_t \tag{9}$$

$$H(z) = \frac{G}{1 + \sum_{k=1}^{p} a_k z^{-k}} \tag{10}$$

Since the output, $u_t$, is totally unknown, the output signal, $x_t$, can only be approximately predicted from previous samples, i.e.

$$\tilde{x}_t = -\sum_{k=1}^{p} a_k x_{t-k} \tag{11}$$

Where $\tilde{x}_t$ is the approximation of $x_t$. The difference between the actual value $\tilde{x}_t$ and the predicted value $x_t$ is called the residual error, $e_t$, which is given by:

$$e_t = x_t - \tilde{x}_t = x_t + \sum_{k=1}^{p} a_k x_{t-k} \tag{12}$$

The predictor coefficients, $a_k$, should be adapted to minimize the error signal, $e_t$, which is achieved by the minimization of the total squared prediction error with respect to the coefficients. The total squared error, E, is defined as:

$$E = \sum_t e_t^2 = \sum_t \left( x_t + \sum_{k=1}^{p} a_k x_{t-k} \right)^2 \tag{13}$$

To minimize E with respect to each of the coefficients, equation (13) is differentiated with respect to $a_i$ and the resulting derivatives are set to zero. The minimum total squared error, $E_p$, can finally be given as:

$$E_p = \sum_t x_t^2 + \sum_{k=1}^{p} a_k \sum_t x_t x_{t-k} \tag{14}$$

By solving the set of p equations, given in equation (14) in p unknowns, the linear prediction coefficients $a_k$ which minimize the total squared error can be obtained.

APPENDIX B

The F-Ratio

The ability of statistical parameters to discriminate different flowrates was quantified by the F-ratio test. The F-ratio test is normally employed in automatic speaker recognition techniques and in that context it is defined as:

$$F = \frac{\text{variance of speaker means}}{\text{average within speaker variance}} \quad (1)$$

$$= <[x_i - \bar{\mu}]^2>_i / <[x_a^{(i)} - \bar{x}_i]^2>_{a,i}$$

In this invention the F-ratio was adopted such that "a particular gas-liquid superficial flowrate (flow condition)" is substituted for "speaker". Thus in equation (1), $x^{(i)}$ is the parameter value from the $a$th block of the signal representing the ith flow condition. $<\ >_i$ indicates averaging over various flow conditions, $<\ >_a$ indicates averaging over the different blocks of a single flow condition, $\bar{x}_i$ is the estimated mean value of the feature for the ith flow condition, i.e.

$$\bar{x}_i = <x_a^{(i)}>_a \quad (2)$$

and finally, $\bar{\mu}$ is the overall mean value of the feature averaged over all flow conditions, i.e.

$$\bar{\mu} = <\bar{x}_i>_i \quad (3)$$

Thus in this specific embodiment of the present invention, the relative strength of a parameter to discriminate between different flowrates is quantified with reference to the increasing value of the F-ratio.

APPENDIX C

Template Matching Categorizer by Euclidian Distance

In this method, the MEASURED PARAMETER VECTOR 'M' consisting of 3*9 elements (parameters) is compared with each one of the CALIBRATION PARAMETER VECTORS (one calibration vector on each grid node on the superficial liquid-gas velocity domain). The match is quantified by the Euclidian distance given by:

$$D_e^{(j)} = \sum_{i=1}^{N} [(M_i - C_i^{(j)})/SD_i]^2 \quad (1)$$

where $D_e^{(j)}$ is the Euclidean distance between the measured vector 'M' and the calibration vector set $C^{(j)}$. $M_i$ and $C_i$ are the ith element of the measured and the calibration parameter vectors and N is the number of elements in the vector set. $SD_i$ is the standard deviation of the ith feature used to normalize the feature domains.

TABLE 1

F-ratio of absolute and differential pressure signal features

| Feature | F-ratio | | | |
|---|---|---|---|---|
| | Absolute pressure | Radial differential | Axial - differential | |
| | | | 1 D | 8.4 D |
| SD | 29.0 | 53.2 | 39.6 | 60.5 |
| CS | 2.00 | 0.28 | 0.12 | 1.66 |
| CK | 0.63 | 0.76 | 0.53 | 1.18 |
| $V_p$ | 2.90 | 5.09 | 3.42 | 2.79 |
| $a_1$ | 5.30 | 5.48 | 6.29 | 2.01 |
| $a_2$ | 4.00 | 2.23 | 6.61 | 1.15 |
| $a_3$ | 2.00 | 0.95 | 2.21 | 0.57 |
| $a_4$ | 1.90 | 2.10 | 4.70 | 0.94 |

We claim:

1. A method of determining flowrates of individual phases of a flowing multiphase medium, comprising the steps of:
    monitoring an electrical output signal from a detector which produces said output signal in response to one or more flow-related characteristics of said flowing multiphase medium;
    deriving from said output signal a plurality of derived parameters selected from amplitude parameters, frequency parameters, or both amplitude and frequency parameters;
    comparing each of said derived parameters with a corresponding calibration map relating that derived parameter to a range of possible flowrates of component phases of said flowing multiphase medium; and,
    determining as a measure of flowrates of component phases of said flowing multiphase medium, a unique flowrate, common to all of a plurality of calibration maps, which is uniquely related to said derived parameters, said unique flowrate representing a flowrate of an individual phase of said flowing multiphase medium.

2. A method as claimed in claim 1 wherein said determining step includes determination of gas and liquid flowrates in a two phase stream.

3. A method as claimed in claim 1 wherein flowrates are determined from parameters derived from a waveform of electrical signals related to an absolute pressure of said medium, differential pressure across radially and axially separated locations and a void fraction.

4. A method as claimed in claim 1 wherein electrical signals are obtained from transducers generating a high frequency waveform related to flow characteristics.

5. A method as claimed in claim 1 wherein upsteam and downstream influences are isolated and signal characteristics are enhanced.

6. A method as claimed in claim 5 wherein a uniquely configured measuring pipe equipped with flow mixers and sensors is employed.

7. A method as claimed in claim 1 wherein calibration maps are stored in a database in an electronic memory and sequential comparison of detector output with said calibration maps is effected by a data processor.

8. A method as claimed in claim 1 further including the following steps for obtaining a calibration map
    (a) detecting a turbulence record of flow,
    (b) reducing said turbulence record to a set of parameters by a mathematical model which characterize properties of said turbulence record in frequency and amplitude domains, and
    (c) assembling a superficial velocity contour map of each parameter.

9. A method as claimed in claim 8 wherein said mathematical model in step (b) comprises a mathematical algorithm.

10. A method as claimed in claim 9 wherein said mathematical algorithm includes a speech-recognition-type algorithm.

11. A method as claimed in claim 1 wherein said amplitude parameters include standard deviation, coefficient of skewness and coefficient of kurtosis.

12. A method as claimed in claim 1 wherein said frequency parameters include linear prediction model (LPM) coefficients and a cepstrum function.

13. A method as claimed in claim 1 wherein comparison between measured and calibration parameters is effected by template matching.

14. A method as claimed in claim 1 wherein comparison between measured and calibration parameters is effected by a heuristic technique.

* * * * *